United States Patent
Kim (10) Patent No.: US 7,212,368 B2
(45) Date of Patent: May 1, 2007

(54) HEAD SWITCHING METHOD AND SYSTEM USING TRACK NUMBER MATCHING

(75) Inventor: Jae-hyeong Kim, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 213 days.

(21) Appl. No.: 10/717,574

(22) Filed: Nov. 21, 2003

(65) Prior Publication Data
US 2004/0100713 A1    May 27, 2004

(30) Foreign Application Priority Data
Nov. 25, 2002    (KR) .................... 10-2002-0073477

(51) Int. Cl.
*G11B 15/12* (2006.01)
(52) U.S. Cl. .................................................. 360/63
(58) Field of Classification Search ............ None
See application file for complete search history.

(56) References Cited

U.S. PATENT DOCUMENTS

| | | | |
|---|---|---|---|
| 5,245,594 A | | 9/1993 | Shimizu .................. 369/32 |
| 5,796,542 A | | 8/1998 | Szeremeta ............... 360/77.02 |
| 5,880,901 A | * | 3/1999 | Smith et al. ............. 360/75 |
| 5,969,895 A | * | 10/1999 | Ueda et al. .............. 360/61 |
| 6,031,680 A | | 2/2000 | Chainer et al. ........... 360/75 |
| 6,078,460 A | * | 6/2000 | Moriya .................. 360/77.04 |
| 6,229,784 B1 | * | 5/2001 | Yoshimoto et al. ....... 369/275.2 |
| 6,292,324 B1 | | 9/2001 | Ho et al. ................ 360/77.04 |
| 6,710,957 B2 | * | 3/2004 | Nakasato ................ 360/51 |
| 6,975,468 B1 | * | 12/2005 | Melrose et al. .......... 360/31 |
| 7,075,747 B2 | * | 7/2006 | Takaishi ................ 360/77.04 |
| 2001/0022702 A1 | | 9/2001 | Takaishi et al. .......... 360/63 |

* cited by examiner

*Primary Examiner*—Andrea Wellington
*Assistant Examiner*—Glenda P. Rodriguez
(74) *Attorney, Agent, or Firm*—Staas & Halsey LLP

(57) ABSTRACT

A method and system of switching heads in a hard disk drive written using an off-line STW method. In the method, first, deviations between a reference head and each of the heads are calculated. Next, a mapping table having the deviations between the reference head and each of the heads is generated and stored in a memory. Thereafter, when a head switching operation is requested, a current head is switched to a new head to access a track whose number is the same as the track assessed by the current head. A deviation of a track on which the head is positioned, recorded in the mapping table, is applied to the virtual track address of the track on which the head is positioned, thereby obtaining the physical track address of the track on which the head is positioned. The requested track is then accessed based on the obtained physical track address. As described above, in the head switching method, even when disks for a hard disk drive are written using an off-line STW method, the individual disks can be accessed based on an identical virtual track address. Thus, the performance of the hard disk drive is not degraded.

24 Claims, 6 Drawing Sheets

HEAD SWITCHING METHOD AND SYSTEM USING TRACK NUMBER MATCHING

CROSS-REFERENCE TO RELATED APPLICATIONS

This application claims the benefit of Korean Patent Application No. 2002-73477, filed on Nov. 25, 2002, in the Korean Intellectual Property Office, the disclosure of which is incorporated herein by reference.

BACKGROUND OF THE INVENTION

1. Field of the Invention

The present invention relates to hard disk drives, and more particularly, to a method of switching heads of a hard disk drive written using an off-line, servo track writing (STW) method.

2. Description of the Related Art

In general, hard disk drives include a plurality of disks and heads, wherein an individual disk is accessed by a corresponding head. Addresses used to access each disk are classified as head addresses, cylinder addresses, and sector addresses. As used herein, cylinders correspond to the tracks of a disk.

Servo tracks on conventional hard disk drives are written using an on-line STW method, where disks are first assembled on a drive and then servo data is recorded on the assembled disks. In other words, during a conventional hard disk drive manufacturing process, first, a disk assembly process is performed and then, servo tracks are written on the disks using a servo writing process. In the disk assembly process, a plurality of disks are assembled and fixed onto a drive. In the servo writing process, servo data, that is, track and sector addresses and servo address marks are recorded on the assembled disk by using a servo writer. U.S. Pat. No. 5,796,542 describes a method and apparatus for simultaneous servowriting on a plurality of disks. Also, U.S. Pat. No. 6,031,680 describes a method for self-servowriting.

In the on-line STW method, since all of the heads of a servo writer simultaneously perform servo writing, the track addresses of the individual disks on which corresponding heads are positioned are identical.

However, in recent hard disk drive manufacturing methods, the servo writing process is performed prior to the disk assembly process to achieve a simpler process. In other words, servo information is first individually recorded on each disk, and then the disks are assembled. This method is referred to as an off-line STW method.

In contrast with a hard disk drive having disks with information written using the on-line STW method, the disks of a hard disk drive having information written using the off-line STW method basically represent different track addresses when heads are positioned thereon. In other words, even when the disks are accurately assembled, there exists a deviation between disks due to an assembly tolerance. Thus, a deviation between heads is generated during assembly. Such a deviation may be in the order of magnitude of several hundreds of tracks.

The off-line STW method simplifies the process of writing information on a hard disk drive but degrades the performance of disks, that is, lengthens the time required to access the disks.

Figure 1:
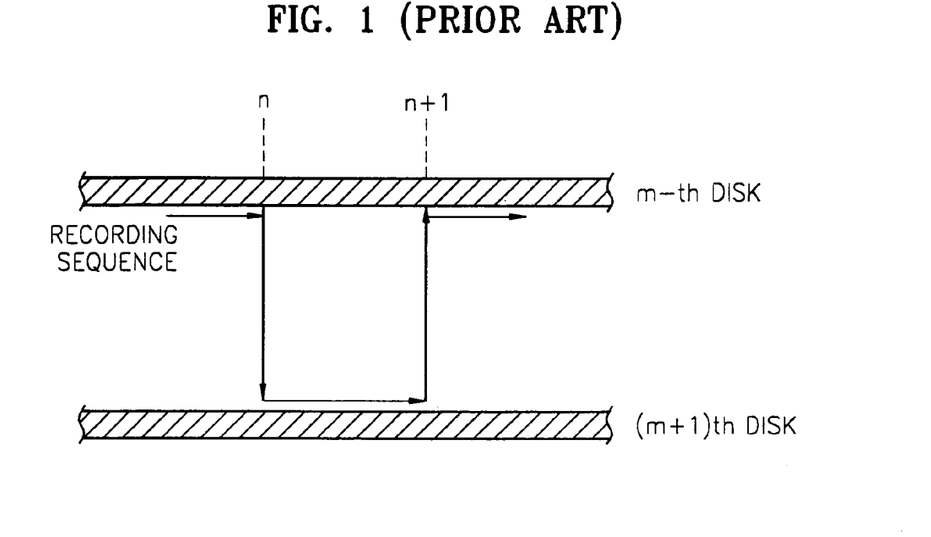
FIG. 1 is a diagram illustrating a conventional disk accessing method.

FIG. 1 illustrates a conventional disk accessing method. Referring to FIG. 1, upon recording, data is first recorded on an n-th track of an m-th disk and then on an n-th track of an (m+1)th disk. Next, data is recorded on the (n+1)th track of the (m+1)th disk and subsequently on the (n+1)th track of the m-th disk. In this example, since the m-th and (m+1)th disks are accessed by different heads, the heads are switched to record data on their corresponding disks.

According to a conventional disk accessing method, data can be recorded sequentially on two tracks of the m-th disk and (m+1)th disk by head switching and a track seeking. Head switching denotes a simple electrical head selection without accompanying the physical movement of a head assembly. While data is being recorded on two tracks, only a one-time track seeking is performed by the head assembly. Hence, while data is being recorded on p tracks, only p/2 times of track seeking are performed by the head assembly. Thus, the access time is reduced.

However, if disks, assembled and having information written using the off-line STW method, are accessed in the disk accessing method of FIG. 1, the time of track seeking increases, resulting in degradation in the performance of the hard disk drive. The accessing of the disks assembled, having information written by the off-line STW method using a conventional accessing method is illustrated in FIG. 2.

Disks assembled and written using the off-line STW method have a deviation in track addresses. The deviation can be reduced through improvements in the assembly accuracy. However, substantially eliminating the deviation is almost impossible, and furthermore, the deviation magnitude may amount to several hundreds of tracks.

Figure 2:
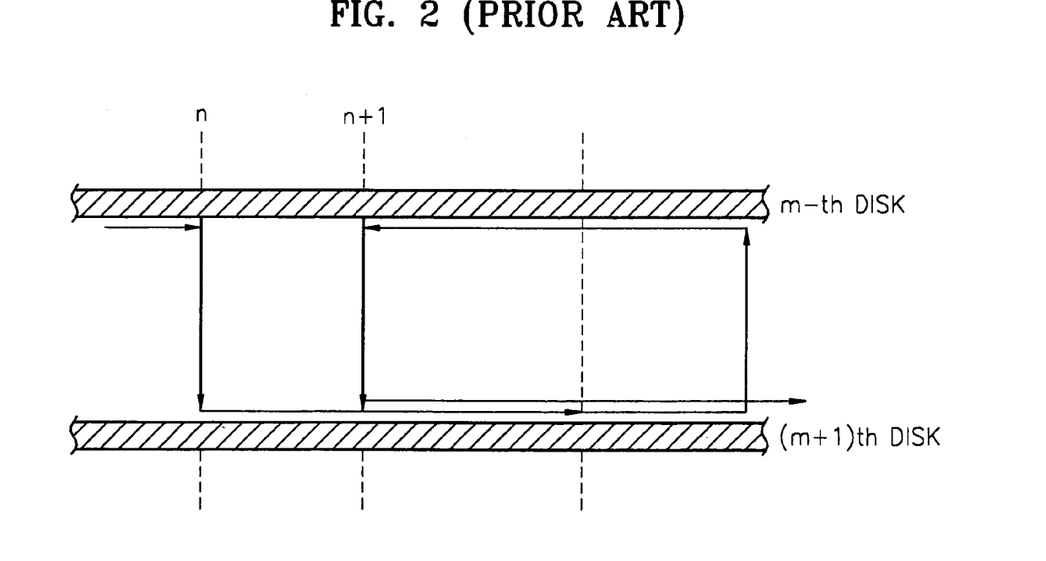
FIG. 2 is a diagram illustrating a process of accessing disks assembled and written using an off-line STW method according to a conventional accessing method.

Referring to FIG. 2, after data is recorded on an n-th track of an m-th disk, a head switching occurs to record data on an n-th track of an (m+1)th disk. However, because a deviation exists between the tracks of the m-th and (m+1)th disks on which heads are currently positioned, the n-th track of the (m+1)th disk cannot be completely accessed by accomplishing only a head switching operation. In other words, a track seeking operation is required to position a head accurately on the n-th track of the (m+1)th disk. If the n-th track of the (m+1)th disk is accurately found, data is recorded on the found n-th track and subsequently on an (n+1)th track of the (m+1)th disk.

Thereafter, as described above, a head switching operation is performed to record data on the (n+1)th track of the m-th disk. However, as also described above, the (n+1)th track of the m-th disk cannot be completely accessed by only a head switching operation. Hence, a track seeking operation must also be performed to position the head accurately on the (n+1)th track of the m-th disk.

In summary, hard disk drives having information written using the off-line STW method must perform both a head switching operation and a track seeking operation in order to properly access disks therein. The track seeking operation typically requires about 3–4 ms, which corresponds to about ⅓ of a 7,200 rpm rotation of a hard disk drive.

In contrast with hard disk drives written using the on-line STW method, hard disk drives written using the off-line STW method must additionally perform p/2 track seeking operations to compensate for the deviation between tracks while data is being recorded on p tracks. This results in degradation in the performance of the hard disk drive.

SUMMARY OF THE INVENTION

The present invention provides a head switching method improving the performance of a hard disk drive having information written using an off-line STW method.

According to an aspect of the present invention, a method of switching heads in a hard disk drive is provided. In the method, first, deviations between a reference head and each of the heads are calculated. Next, a mapping table is composed using the calculated deviations between the reference head and each of the heads and stored in a memory. Thereafter, a head in operation is switched to a head associated with a track requested to be accessed, and a deviation corresponding to the switched head, which is recorded in the mapping table, is applied to the virtual track address of the track on which the switched head is positioned, to obtain the physical track address of the track on which the switched head is positioned. The track to be accessed is accurately accessed based on the obtained physical track address.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

In hard disk drives having information written using an off-line STW method, the track addresses of previous and current disks on which switched previous and current heads are positioned must be the same as in hard disk drives manufactured using an on-line STW method, and thus a track seeking operation of seeking the same track on the current disk as the track on the previous disk accessed by the previous head is not required to be performed.

Accordingly, to solve the above problem, virtual addresses compensated according to a deviation between heads are used, instead of the physical addresses of the individual disks corresponding to the head positions. Data reading and writing are performed using the virtual addresses.

Figure 3:
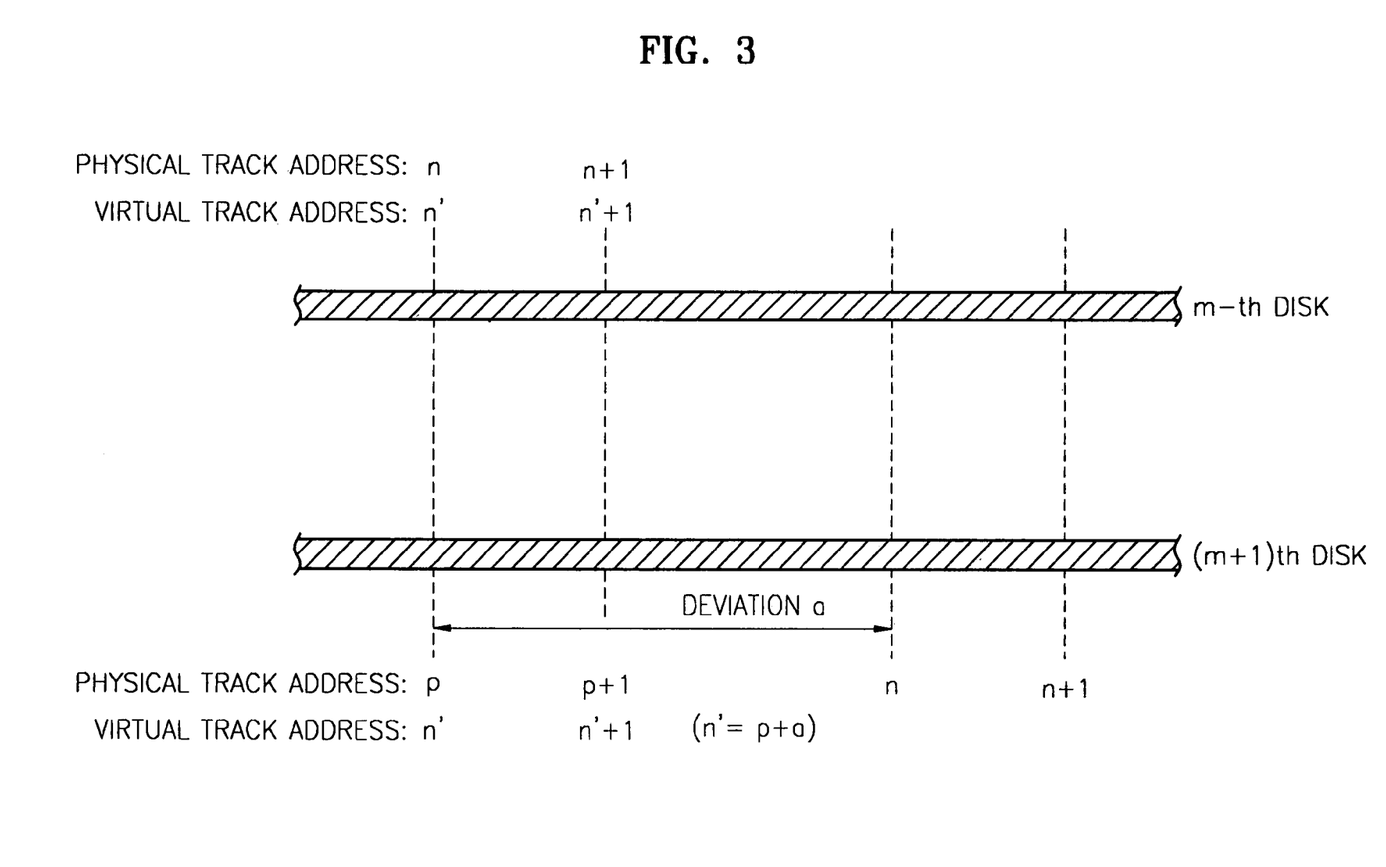
FIG. 3 is a diagram illustrating a head switching method according to an aspect of the present invention.

FIG. 3 is a diagram illustrating a head switching method according to an aspect of the present invention. In FIG. 3, the upper disk is referred to as an m-th disk, the lower disk is referred to as an (m+1)th disk, the physical track address of a track on the m-th disk on which its corresponding head is positioned is indicated by n, and the physical track address of a track on the (m+1)th disk on which its corresponding head is positioned is indicated by p. In other words, the m-th and (m+1)th disks have been assembled with a track address deviation of "a", where a=n−p.

The m-th disk is assumed as the disk that acts as a basis of address mapping (hereinafter, referred to as a reference disk). The reference disk is used in calculating track address deviations used to map the virtual track addresses of other disks. Hence, the physical track address and virtual track address of the m-th reference disk must be substantially identical.

The virtual track address of the (m+1)th disk is calculated as n', where n'=p+a, and accordingly is equal to the virtual track address n' of the m-th disk.

By using such virtual track addresses, hard disk drives manufactured using an off-line STW method can access disks in the same way as previously described in reference to FIG. 1 without a need to perform a track seeking operation as shown in FIG. 2 to compensate for a track address deviation between heads. As a result, the performance of the hard disk drives is improved.

The virtual address mapping is performed together with a head switching operation.

Since a hard disk drive typically has a plurality of disks, a mapping table having the track address deviations of individual heads for accessing corresponding disks is stored in a memory. When a head switching operation occurs, the physical track address of a new head is obtained by referring to the memory.

Figure 4:
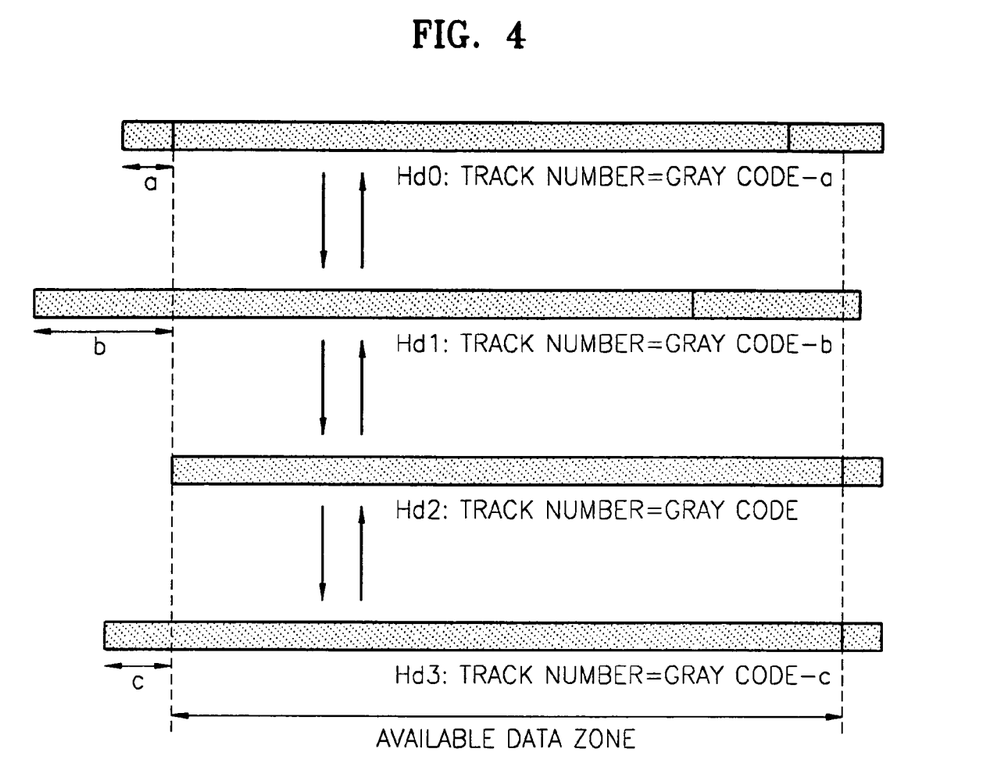
FIG. 4 is a diagram illustrating a method of calculating an available data zone and a deviation in a head switching method according to an aspect of the present invention.

FIG. 4 is a diagram illustrating a method of calculating an available data zone and a deviation upon head switching according to an aspect of the present invention. FIG. 4 shows an assembly of four heads having the third head (which accesses the upper surface of the second disk from the top) serving as a reference head.

In FIG. 4, the left side refers to an outer boundary of a disk, and the right side refers to an inner boundary of the disk. In other words, FIG. 4 shows a left half of a disk. Not shown in FIG. 4 are a disk hole and the right half of the disk.

First, second, and fourth heads Hd0, Hd1, and Hd3, respectively, in FIG. 4 are assembled with track address deviations of "a", "b", and "c", respectively, with respect to the third head Hd2 (reference head).

Virtual track addresses of tracks on different disks, accessed by corresponding heads, can be equalized by subtracting a track address deviation of "a" from a physical track address accessed by the first head, subtracting a track address deviation of "b" from a physical track address accessed by the second head, and subtracting a track address deviation of "c" from a physical track address accessed by the fourth head.

A mapping table having track address deviations of the individual heads is stored in a memory.

Figure 5:
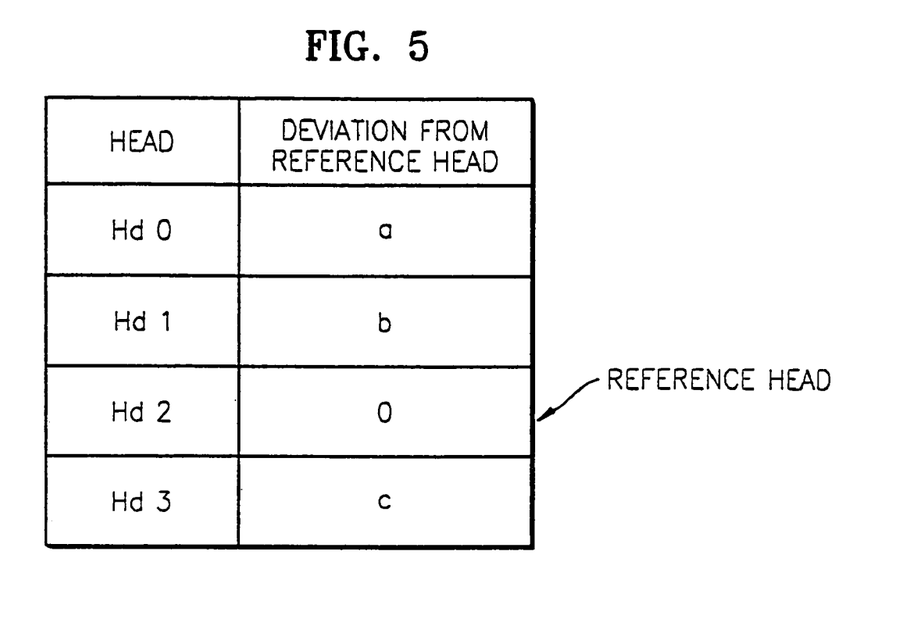
FIG. 5 is a mapping table.

FIG. 5 shows an example of a mapping table. The mapping table of FIG. 5 records sequentially a deviation of "a" between the first head and the third head (reference head), a deviation of "b" between the second head and the third head (reference head), a deviation of "0" of the third head, and a deviation of "c" between the fourth head and the third head (reference head). A controller, included in a hard disk drive, obtains physical track addresses by referring to the mapping table stored in a memory.

The reference head of FIG. 4 has the smallest value among the deviation values recorded in the mapping table of FIG. 5.

Referring back to FIG. 4, an area within the dashed lines denotes an available data zone of a hard disk drive. Track regions to the left of the left dashed line on the first, second, and fourth disk surfaces are not used because the tracks are located outside the outer boundary of the reference disk and thus have negative virtual track addresses. Also, some disks do not have physical tracks corresponding to the virtual track addresses.

Similarly, track regions to the right of the right dashed line on the first, second, and fourth disk surfaces are not used.

When a head switching method according to an aspect the present invention is used, the storage capacity of a hard disk drive is reduced somewhat due to the non-use of tracks around the inner and outer boundaries of each disk. However, a slight loss in the storage capacity is not a major concern in large-capacity disks. Also, because the increasing multimedia environment demands a fast access time, improvements in the performance characteristics of hard disk drives is preferable to a slight loss of the storage capacity.

As shown in FIG. 4, the limit of the outer boundary of the available data zone corresponds to the first track from the outer boundary of the third reference disk surface accessed by the reference head. The limit of the inner boundary of the available data zone corresponds to the last track at the outer boundary of the second disk surface accessed by the head having the greatest deviation.

Figure 6:
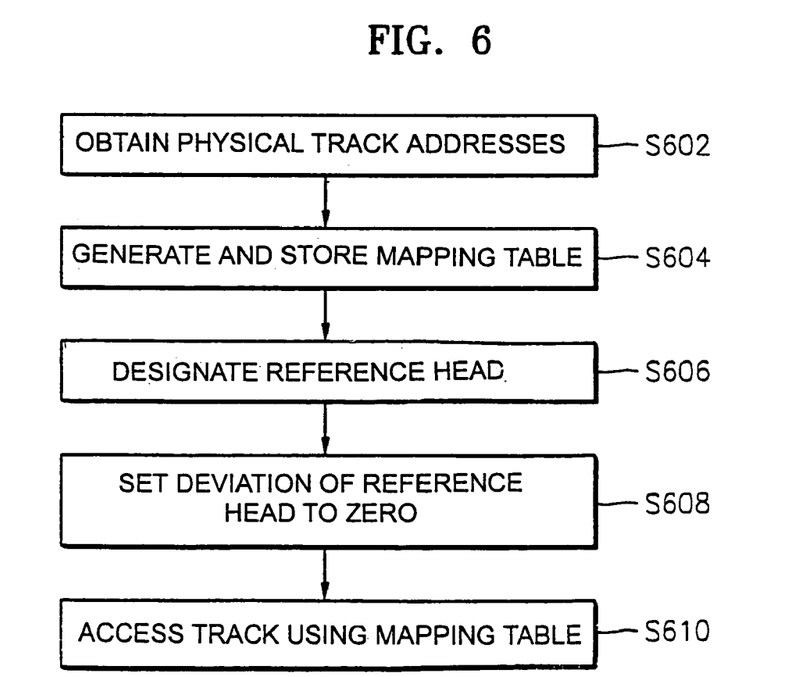
FIG. 6 is a flowchart illustrating a head switching method according to an aspect of the present invention.

FIG. 6 is a flowchart illustrating a head switching method according to an aspect of the present invention. First, heads are positioned at arbitrary locations, and the physical track addresses of tracks accessed by the heads are obtained (S602). To be more specific, heads are positioned over the middle areas of corresponding disk surfaces, and the physical track addresses of the disk surfaces accessed by the heads are obtained.

Next (S604), a mapping table having the physical track addresses accessed by the heads is generated and stored in a memory.

In operation S606, a reference head is designated to be used for address mapping. To be more specific, a head having a physical track address whose absolute value is the smallest among the physical track addresses recorded in the mapping table is selected as the reference head.

In operation S608, the deviation of the reference head is set as a zero value by adding an identical constant to the physical track addresses accessed by the respective, individual heads.

To be more specific, the deviation of the reference head to be recorded in the mapping table is set to be zero by subtracting the physical track address accessed by the reference head from each of the physical track addresses accessed by the individual heads. The track address deviations of the heads with respect to the reference head are obtained by the above subtractions and recorded in the mapping table.

In the example, given that the physical track address accessed by the reference head (third head) is "p", if the physical track address accessed by the first head is (p+a), a track address deviation between the two heads is "a". If the physical track address accessed by the second head is (p+b), a track address deviation between the two heads is "b". If the physical track address accessed by the fourth head is (p+c), a track address deviation between the two heads is "c".

In operation S610, when a new head is requested to access a new corresponding track, a current head is switched to the new head. At this time, the track address deviation of the switched head stored in the memory is applied to the virtual track address of a track on which the switched head is positioned, thereby obtaining the physical track address of the track on which the switched head is positioned. Using the obtained physical track address, the requested track is accessed.

Through this operation, a hard disk drive looks as if it is being accessed based on the virtual track addresses of the disks.

Figure 7:
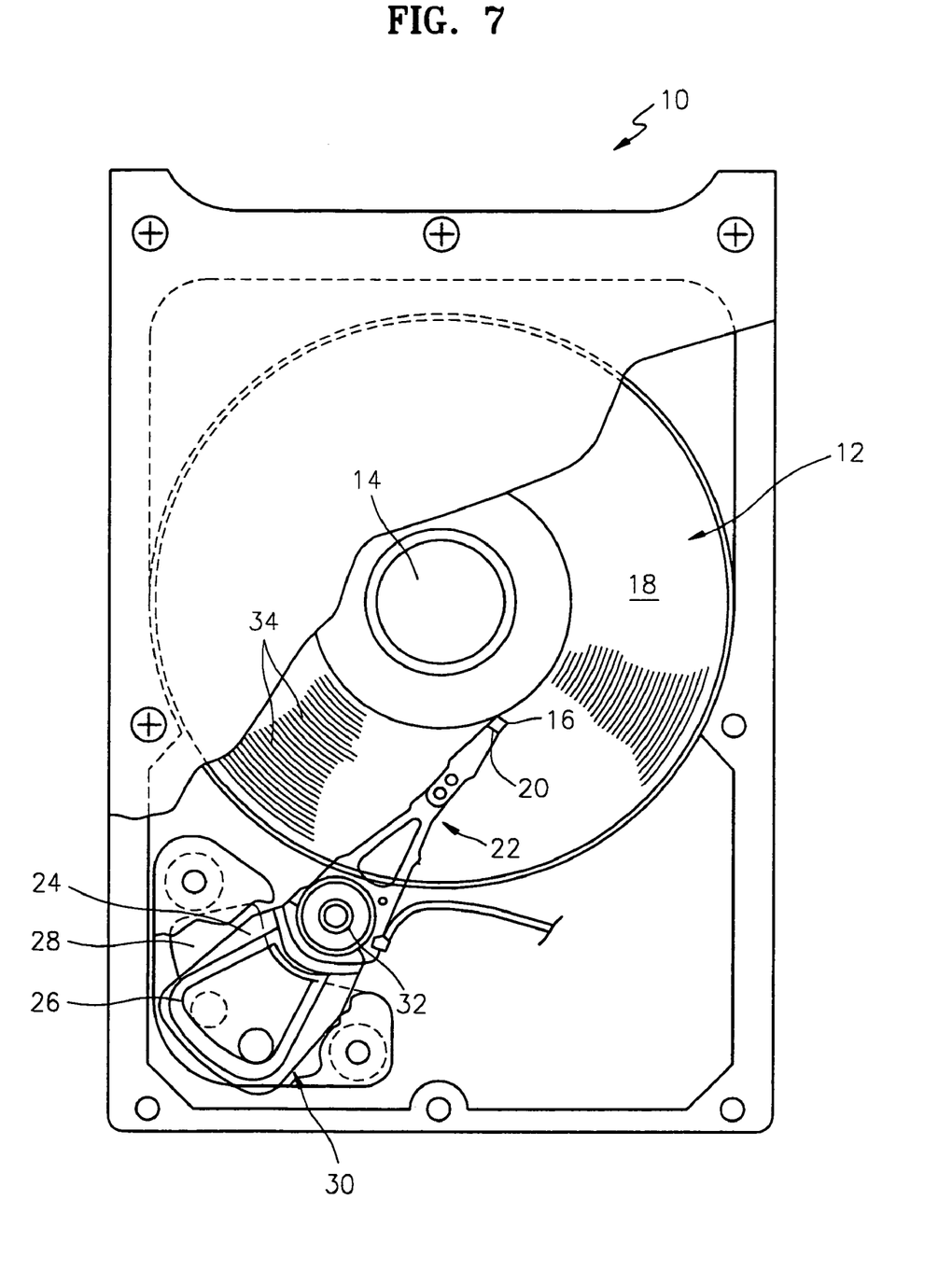
FIG. 7 is a perspective view of a conventional hard disk drive.

FIG. 7 is a perspective view of a hard disk drive 10 including at least one magnetic disk 12 rotated by a spindle motor 14. The hard disk drive 10 also includes a head 16 located close to a disk surface 18.

The head 16 can read data from, or write data to, the rotating magnetic disk 12 by detecting a magnetic field from the magnetic disk 12 and magnetizing the magnetic field. The head 16 is typically coupled to the disk surface 18. Although a single head 16 is shown in FIG. 7, the head 16 includes two separate heads: a write head magnetizing the magnetic disk 12 and a read head detecting the magnetic field of the magnetic disk 12. The read head is typically a magneto-resistive (MR) device.

The head 16 can be incorporated into a slider 20. The slider 20 produces an air bearing between the head 16 and the disk surface 18 and is coupled to a head gimbal assembly 22. The head gimbal assembly 22 is attached to an actuator arm 24 having a voice coil 26. The voice coil 26 is located close to a magnetic assembly 28 of a voice coil motor (VCM) 30. A current supplied to the voice coil 26 generates a torque for rotating the actuator arm 24 about the bearing assembly 32. The rotation of the actuator arm 24 moves the head 16 over the disk surface 18.

Data is generally stored in circular tracks 34 of the magnetic disk 12. Each of the tracks 34 generally includes a plurality of sectors. Each of the sectors includes a data field and an identification field. The identification field is comprised of gray codes which distinguish sectors from tracks (cylinders). The head 16 moves over the disk surface 18 to read data, from or write data to, the tracks. The movement of a head from one track to another track is generally referred to as a seek routine.

Figure 8:
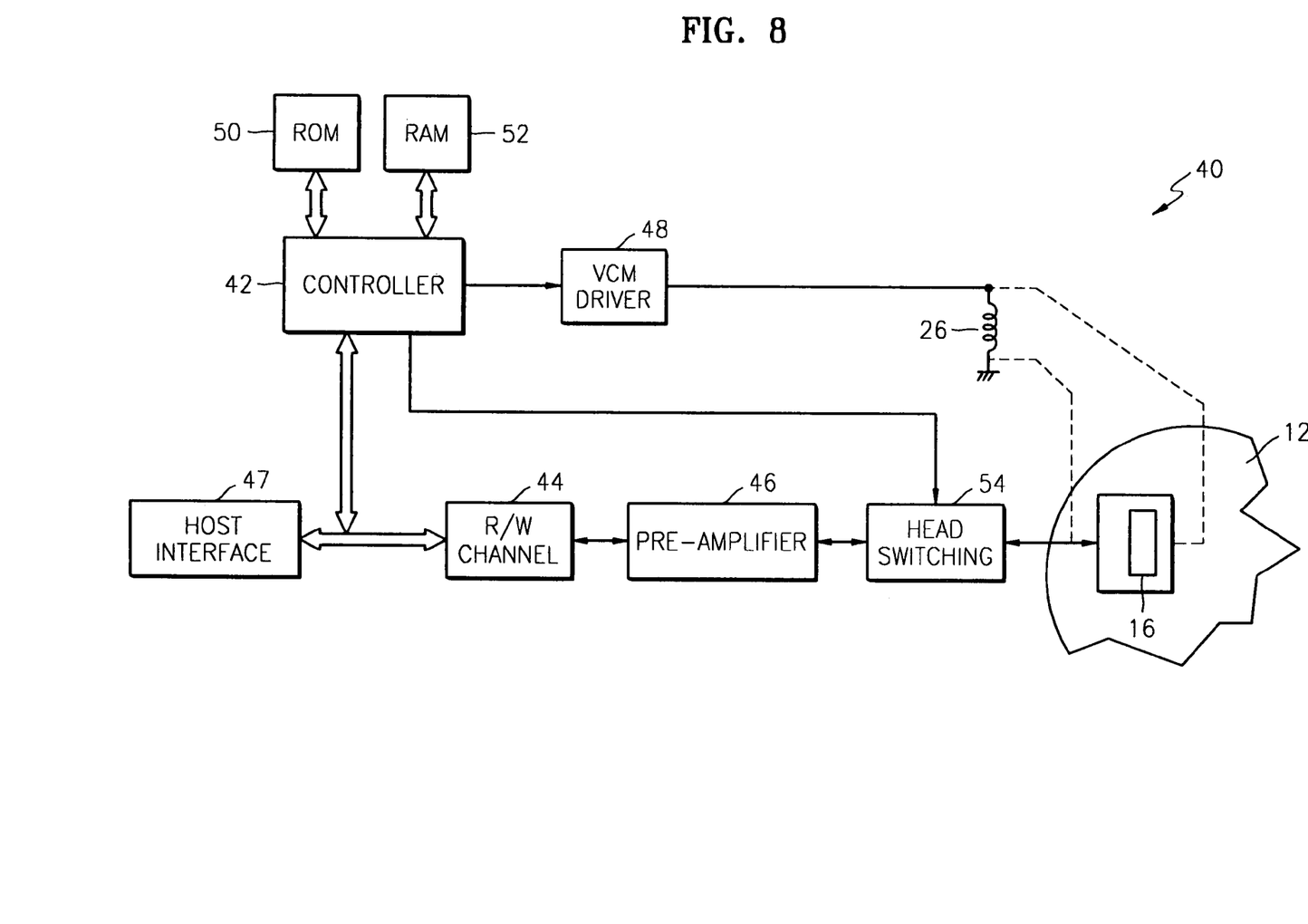
FIG. 8 is a block diagram of a system that can control a hard disk drive to which a head switching method according to an aspect of the present invention is applied.

FIG. 8 is a block diagram of a system 40 controlling the hard disk drive 10 to which a head switching method according to an aspect of the present invention is applied. The system 40 includes a controller 42 coupled to the head 16 by a read/write (R/W) channel 44 and a pre-amplifier 46. The controller 42 may be a digital signal processor (DSP), a microprocessor, a microcontroller, or the like.

The controller 42 supplies a control signal to the RAN channel 44 to read data from, or write data to, the magnetic disk 12. Data is typically transmitted from the R/W channel 44 to a host interface 47. The host interface 47 includes a buffer memory and a control circuit (not shown) to interact with a system such as a personal computer.

The controller 42 is also coupled to a VCM driver 48 supplying a driving current to the voice coil 26. The controller 42 supplies a control signal to the VCM driver 48 to control the excitation of the VCM 30 and the motion of the head 16.

In a reproduction mode, the R/W channel 44 modulates an analog signal read from the head 16 and amplified by the pre-amplifier 46 into a digital signal capable of being interpreted by a host computer (not shown) and outputs the digital signal to the host interface 47. Also, the R/W channel 44 receives user data from a host computer via the host interface 47, converts the user data into a write current suitable to be written to a disk, and outputs the write current to the pre-amplifier 46.

The controller 42 is coupled to a read-only memory (ROM) 50, which is a nonvolatile memory, and a random access memory (RAM) 52. The ROM 50 and the RAM 52 include command words and data that the controller 42 uses to execute a software routine. Examples of the software routine include a seek routine moving the head 16 from one track to another track and an address mapping routine for calculating virtual track addresses upon head switching. The seek routine includes a servo control routine guaranteeing a movement of a head to a correct track. The address mapping routine calculates physical track addresses by referring to a mapping table stored in the ROM 50 and the RAM 52.

The ROM 50 and the RAM 52 store a mapping table achieving an address mapping according to the present invention as shown in FIGS. 4 and 5.

The controller 42 accesses the magnetic disk 12 using physical track addresses read from the magnetic disk 12 and the mapping table stored in the ROM 50 and RAM 52. The mapping table is formed of the physical track addresses of tracks accessed by heads.

A reference head is designated to achieve track address mapping. As used herein, a head having a physical track address whose absolute value is the smallest in the mapping table is selected as the reference head.

Then, an identical constant is added to each of the deviations of the individual heads, thereby making the deviation of the reference head zero.

When a disk accessing operation is requested, the controller 42 obtains the physical track address of a disk on which a head is positioned to access, by applying the track address deviation of the disk stored in the memory to the virtual track address of the disk. Thus, a track is accessed using the obtained physical track address.

The above-described embodiments of the present invention refer to a case where disks have track address deviations between them. However, the present invention is not limited to these embodiments. For example, when disks have sector address deviations, a sector address mapping can be achieved using the above-described address mapping method.

As described above, in a head switching method according to the present invention, even when disks for a hard disk drive are formed in an off-line STW method, the individual disks can be accessed based on the same virtual track addresses. Thus, the performance of the hard disk drive is not degraded.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of switching heads in a hard disk drive, the method comprising:
    calculating deviations between a reference head and each of the heads;
    generating a mapping table, elements of which are deviations between the reference head and each of the heads, and storing the mapping table in a memory;
    switching a head in operation to a head associated with a track or sector requested to be accessed;
    applying a deviation of the switched head, which is recorded in the mapping table, to the virtual track or the sector address of the track or the sector on which the switched head is positioned, to obtain the physical track or the sector address of the track on which the switched head is positioned; and
    accessing the track or the sector to be accessed based on the obtained physical track or sector address.

2. The method according to claim 1, wherein the reference head is the head having a physical address whose absolute value is the least among read physical addresses of tracks or sectors on which the heads of a head assembly are positioned.

3. The method according to claim 2, further comprising subtracting a physical address deviation of the reference head from each of the physical address deviations of the heads in order to make the physical address deviation of the reference head substantially zero.

4. The method according to claim 1, further comprising defining an available data zone.

5. The method according to claim 4, wherein the available data zone ranges from the first track from the outer boundary of a disk accessed by the reference head to the last track at the inner boundary of a disk accessed by a head having the greatest physical address deviation.

6. A computer-readable medium encoded with processing instructions implementing a method of switching heads in a hard disk drive, the method comprising:
    calculating deviations between a reference head and each of the heads;
    generating a mapping table, elements of which are deviations between the reference head and each of the heads, and storing the mapping table in a memory;
    switching a head in operation to a head associated with a track or a sector requested to be accessed;
    applying a deviation of the switched head, which is recorded in the mapping table, to the virtual track or sector address of the track or sector on which the switched head is positioned, to obtain the physical track or sector address of the track or sector on which the switched head is positioned; and
    accessing the track or sector to be accessed based on the obtained physical track or sector address.

7. The computer-readable medium according to claim 6, wherein the reference head is the head having a physical address whose absolute value is the least among read physical addresses of tracks or sectors on which the heads of a head assembly are positioned.

8. The computer-readable medium according to claim 7, the method further comprising subtracting a physical address deviation of the reference head from each of the physical address deviations of the heads in order to make the physical address deviation of the reference head substantially zero.

9. The computer-readable medium according to claim 6, the method further comprising defining an available data zone.

10. The computer-readable medium according to claim 9, wherein the available data zone ranges from the first track from the outer boundary of a disk accessed by the reference head to the last track at the inner boundary of a disk accessed by a head having the greatest physical address deviation.

11. A method of switching heads in a hard disc drive, comprising:
    positioning heads at arbitrary locations;
    obtaining physical track addresses of tracks accessed by the heads;

designating one of the heads as a reference head to be used for address mapping;

generating and storing a mapping table having the physical track addresses accessed by the heads;

setting the deviation of the reference head as a zero value;

obtaining track address deviations of the heads with respect to the reference head and recording the deviations in the mapping table;

switching one of the heads that is in operation to a head associated with a track to accessed;

applying the track address deviation of the switched head stored in the memory to a virtual track address of a track on which the switched head is positioned and obtaining the physical track address of the track on which the switched head is positioned; and accessing the requested track.

12. The method according to claim 11, wherein the arbitrary locations are over middle areas of corresponding disk surfaces.

13. The method according to claim 11, wherein the reference head is the head having a physical track address whose absolute value is the smallest among the physical track addresses recorded in the mapping table.

14. The method according to claim 11, wherein the setting the deviation of the reference head as a zero value is by adding an identical constant to the physical track addresses accessed by the respective, individual heads.

15. A method of controlling the head switching of a hard disk drive in a system, comprising:

calculating physical track addresses by referring to a mapping table stored in a memory, the mapping table storing a deviation between a reference head and other heads in the hard disk drive and the physical track addresses being calculated by applying a deviation of a switched head to a virtual track address of a track on which the switched head is positioned;

supplying a control signal to read data from, or write data to, a disk;

supplying a control signal to control motion of the head to a track on the disk; and accessing the disk using calculated physical track addresses.

16. The method according to claim 15, wherein calculating physical track addresses includes obtaining the physical track address of the disk on which a head is positioned to access by applying a track address deviation of the disk stored in the memory to a virtual track address of the disk.

17. The method according to claim 16, wherein the virtual track address of the disk is the substantially equal to the virtual track address of a reference disk.

18. A system for controlling switching of heads of a hard disk drive, comprising:

a controller coupled to the heads by a read/write channel and a pre-amplifier;

a memory coupled to the controller;

a host interface coupled to the controller and the read/write channel; and a voice coil motor driver supplying a driving current to the voice coil and coupled to the controller, wherein the controller accesses a disk on the hard disk drive using physical track addresses read from disks on the hard disk drive and a mapping table stored in the memory, the mapping table storing a deviation between a reference head and other heads in the hard disk drive and the physical track addresses being calculated by applying a deviation of a switched head to a virtual track address of a track on which the switched head is positioned.

19. The system according to claim 18, wherein when a disk accessing operation is requested, the controller obtains the physical track address of a disk on which a head is positioned to access by applying a track address deviation of the disk stored in the memory to a virtual track address of the disk.

20. The system according to claim 18, wherein the controller is a digital signal processor, a microprocessor, or a microcontroller.

21. The system according to claim 18, wherein the controller supplies a control signal to the read/write channel to read data from, or write data to, the disk in the disk drive.

22. The system according to claim 18, wherein the host interface includes a buffer memory and a control circuit interacting with a computer.

23. A method of switching heads in a hard disk drive, the method comprising:

calculating deviations between a reference head and each of the heads;

generating a mapping table, elements of which are deviations between the reference head and each of the heads, and storing the mapping table in a memory;

switching a head in operation to a head associated with a track or sector requested to be accessed;

applying a deviation of the switched head, which is recorded in the mapping table, to the virtual track or the sector address of the track or the sector on which the switched head is positioned, to obtain the physical track or the sector address of the track on which the switched head is positioned;

accessing the track or the sector to be accessed based on the obtained physical track or sector address; and subtracting a physical address deviation of the reference head from each of the physical address deviations of the heads in order to make the physical address deviation of the reference head substantially zero;

wherein the reference head is the head having a physical address whose absolute value is the least among read physical addresses of tracks or sectors on which the heads of a head assembly are positioned.

24. A computer-readable medium encoded with processing instructions implementing a method of switching heads in a hard disk drive, the method comprising:

calculating deviations between a reference head and each of the heads;

generating a mapping table, elements of which are deviations between the reference head and each of the heads, and storing the mapping table in a memory;

switching a head in operation to a head associated with a track or a sector requested to be accessed;

applying a deviation of the switched head, which is recorded in the mapping table, to the virtual track or sector address of the track or sector on which the switched head is positioned, to obtain the physical track or sector address of the track or sector on which the switched head is positioned;

accessing the track or sector to be accessed based on the obtained physical track or sector address; and subtracting a physical address deviation of the reference head from each of the physical address deviations of the heads in order to make the physical address deviation of the reference head substantially zero;

wherein the reference head is the head having a physical address whose absolute value is the least among read physical addresses of tracks or sectors on which the heads of a head assembly are positioned.

* * * * *